(12) United States Patent
Chaudhari et al.

(10) Patent No.: US 8,019,986 B2
(45) Date of Patent: Sep. 13, 2011

(54) METHOD AND SYSTEM FOR BOOTING, PROVISIONING AND ACTIVATING HARDWARE AND SOFTWARE CLIENTS

(75) Inventors: Manoj K. Chaudhari, Dayton, NJ (US); Richard M. Woundy, North Reading, MA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1362 days.

(21) Appl. No.: 11/503,830

(22) Filed: Aug. 14, 2006

(65) Prior Publication Data
US 2007/0058792 A1 Mar. 15, 2007

Related U.S. Application Data

(60) Provisional application No. 60/707,639, filed on Aug. 12, 2005.

(51) Int. Cl.
*G06F 9/00* (2006.01)
(52) U.S. Cl. .......................................... 713/100; 713/1
(58) Field of Classification Search .................. 713/1, 2, 713/100; 726/12
See application file for complete search history.

(56) References Cited

U.S. PATENT DOCUMENTS

| | | | |
|---|---|---|---|
| 5,689,708 A * | 11/1997 | Regnier et al. | 709/229 |
| 6,463,474 B1 * | 10/2002 | Fuh et al. | 709/225 |
| 2001/0037407 A1 * | 11/2001 | Dragulev et al. | 709/250 |
| 2003/0045273 A1 * | 3/2003 | Pyhalammi et al. | 455/412 |
| 2005/0055687 A1 * | 3/2005 | Mayer | 717/173 |
| 2005/0071677 A1 * | 3/2005 | Khanna et al. | 713/201 |
| 2005/0108320 A1 * | 5/2005 | Lord et al. | 709/201 |
| 2005/0283832 A1 * | 12/2005 | Pragada et al. | 726/12 |
| 2006/0284892 A1 * | 12/2006 | Sheridan | 345/661 |

* cited by examiner

*Primary Examiner* — Thomas Lee
*Assistant Examiner* — Paul Yanchus, III
(74) *Attorney, Agent, or Firm* — Banner & Witcoff, Ltd.

(57) ABSTRACT

Automated booting of a client for a subscriber is provided for clients that are for use in interactive user sessions that involve multimedia. A subscribe message is sent from the client to a proxy server. The proxy server authenticates the subscribe message, and sends the subscribe message to the configuration server. A notify message is sent to the client from the configuration server. The notify message is sent through the proxy server, and contains a location of a profile for the client. The profile is downloaded to the client. This arrangement allows the persistence of profiles in a centralized place.

20 Claims, 11 Drawing Sheets

METHOD AND SYSTEM FOR BOOTING, PROVISIONING AND ACTIVATING HARDWARE AND SOFTWARE CLIENTS

CROSS-REFERENCE TO RELATED APPLICATION

This application claims the benefit of U.S. provisional application Ser. No. 60/707,639, filed Aug. 12, 2005.

BACKGROUND OF THE INVENTION

1. Field of the Invention

The invention relates to hardware and software based customer premise equipment (CPE) for use in interactive user sessions that involve multimedia. The invention further relates to an automated boot process, and to provisioning and activation technologies for these hardware and software clients.

2. Background Art

Session initiation protocol (SIP) is an existing request/response protocol for initiating, modifying, and terminating interactive user sessions that involve multimedia. SIP-based clients include both hardware and software based customer premise equipment (CPE). Generally, SIP provides signaling and session setup for Internet protocol (IP) communications involving multimedia.

Traditional provisioning approaches used with SIP clients utilize a pull model for provisioning, in which the client checks for configuration changes periodically or requires to be rebooted to get configuration updates. As a result, updates to the SIP clients are traditionally not real-time updates. In addition, by design, SIP is a peer-to-peer protocol. As a result, traditional SIP applications are not configured to maintain persistence of data in a centralized place to enable the subscriber to have a consistent experience across a variety of platforms and hardware solutions. Also, the traditional back-office system does not support clients behind in-home NAT devices or nomadic clients.

For the foregoing reasons, there is a need for a method and system for booting, provisioning, and activating hardware and software clients that address some of the shortcomings in existing approaches.

SUMMARY OF THE INVENTION

It is an object of the invention to provide an improved method and system for booting, provisioning, and activating hardware and software clients.

Some embodiments of the invention involve SIP clients; however, it is to be appreciated that various aspects of the invention may be used with other hardware and software clients used in interactive user sessions using other protocols.

In one embodiment, the invention provides an automated method for booting up SIP-based clients, including both hardware and software based customer premise equipment (CPE). A top-down push mechanism is used for provisioning the user, service, and device information for a subscriber. Boot up configuration information is stored in the network, and supports stationary as well as nomadic SIP-based clients. In preferred embodiments, network address translation (NAT) traversal allows the booting up of SIP-based clients behind NAT devices.

By using the top-down push mechanism, in some embodiments it may be possible to propagate updates from the billing system, provisioning system, self-care portal, etc., to SIP-based clients in real-time if the client is online. In the event that the client is not online, the updates could be provided at the next log in or boot up of the client.

In some embodiments, configuration parameters (for example, user preferences, etc.) from the soft client or hard client may be uploaded to the provisioning system.

DETAILED DESCRIPTION OF THE PREFERRED EMBODIMENT

Figure 1:
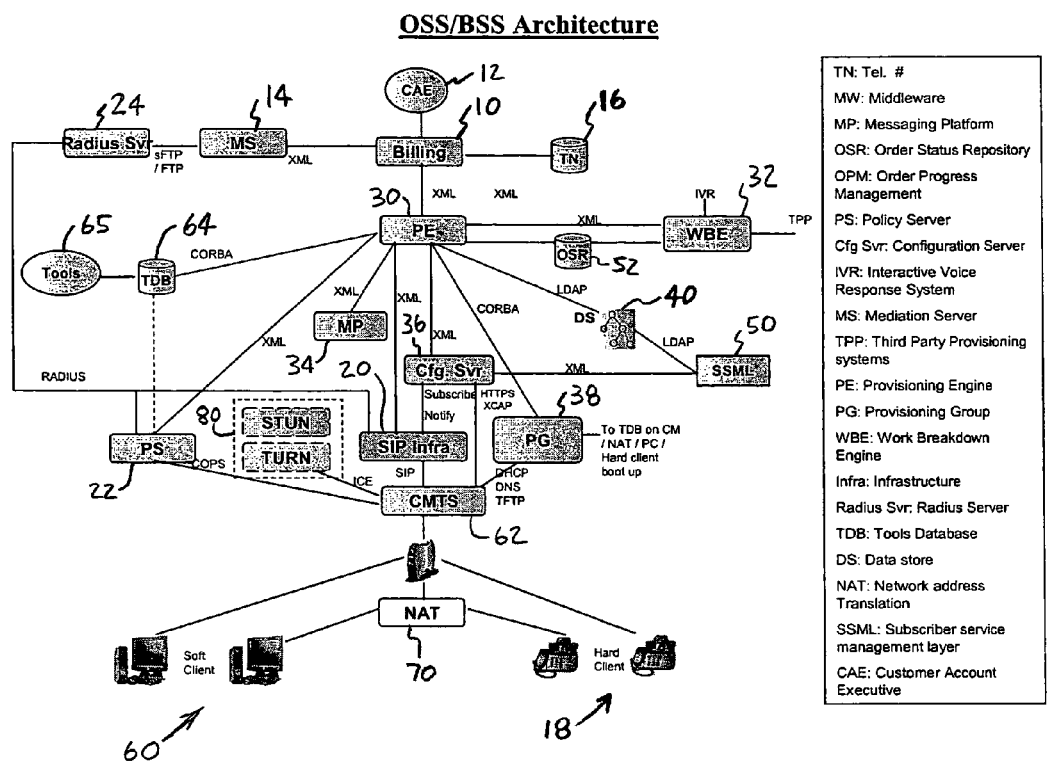
FIG. 1 illustrates the system architecture for implementing the invention in the preferred embodiment.

FIG. 1 provides a high-level view of the functionality that various systems perform in the preferred embodiment.

1. Billing Systems (10)

Billing systems 10 perform the following functions:

Order Entry: Customer Account Executive (CAE) 12, or Customer Service Representative (CSR), will be able to create new orders in the billing systems 10. Self-provisioning by the customer using a Portal is another mechanism to create new orders.

Monthly bill generation: Billing systems 10 interact with the Mediation Server (MS) 14 to generate monthly bills for each subscriber. The monthly bill (one per multiple service subscriptions) has monthly recurring charges (service charges, call features, rental charges, etc.), Call detail records (date, time, place, telephone number (TN), type of rate, number of minutes, and amount of charge), non-recurring charges, regulatory recovery fees (911, Universal connectivity, LNP fee, etc.), surcharge (subscriber line), taxes (federal, state and local).

Billing inquiry support: CAE 12 has access to call detail information sent from the MS 14 to handle disputes and to apply credit for calls.

Rate Code Management: Service package and rate code information is available for use to the CAE 12 and the order entry Portal. Based on the rate code, individual calls will be rated by time of day, local/long distance/international, etc.

Workforce Management functionalities: Technician scheduling, setting up customer appointments based on real-time technician availability information and work assignment are some of the capabilities that billing systems 10 provide.

CPE inventory management: The Billing systems 10 provide inventory management and equipment tracking for hard clients (HC) 18.

2. Mediation Server (MS) (14)

The service architecture includes the SIP Infrastructure 20, Policy Server (PS) 22 and Session Border Controller (SBC) which generate RADIUS accounting events, and not full Call Detail Records (CDRs). These events are generated for each SIP message transaction (e.g., INVITE, BYE) and for each (originating and terminating) call leg during a call. The RADIUS server 24 collects these accounting events and sends them to MS 14 using flat files for call metering and rating as per service package information.

MS 14 performs RADIUS event correlation using subscriber account information provided by billing systems 10 to derive CDRs and call dispositions. MS 14 then forwards the CDRs to billing systems 10. MS 14 supports billing inquiries from Portal to display call logs in near real-time.

3. RADIUS Server (24)

Radius server 24 collects all event messages [startup/shutdown/connect/disconnect/failed requests/missed/forwarded/Voicemail/QoS on-off, etc.] sent by the SIP Infrastructure 20, PS 22 and SBC to create flat file/s to be sent to the MS 14 for further processing.

4. Provisioning Engine (PE) (30)

PE 30 receives service requests (add/delete/modify) from billing systems 10 to perform subscriber and service provisioning using Work Breakdown Engine (WBE) 32 to drive the workflow. PE 30 interfaces with Messaging Platform (MP) 34, Configuration Server (CS) 36, SIP Infrastructure 20, PS 22, Provisioning Group (PG) 38 to keep these systems in sync with the Data Store (DS) 40 (source of truth).

PE 30 receives password update requests from Subscriber Service Management Layer (SSML) 50 and ensures that the SIP Infrastructure 20 is updated with this data.

PE 30 receives client preferences and address book changes from SSML 50 (changes made from the Portal) and sends an update trigger to Configuration Server 36.

PE 30 receives call feature detail changes from the Portal and writes the information to SIP Infrastructure 20.

PE 30 receives call feature details queries from the Portal. The PE will process requests using SIP Infrastructure adapters to send back the details to the Portal.

5. Work Breakdown Engine (WBE) (32)

PE 30 will communicate with the WBE 32 to get work order breakdown for service requests (add/delete/modify). WBE 32 will maintain the timing and order of provisioning operations.

All work order breakdown service requests from WBE 32 are transactional in nature, following a particular sequence. Status of orders will be updated in the Order Status Repository (OSR) 52. On failures, these provisioning transactions originated from WBE 32 will not be rolled back to preserve the state for further analysis during order fall out handling. The service fulfillment agent will handle fall out orders and correct the trouble to complete and close the order.

WBE 32 interacts with TPP (voice third party provisioning) systems for LIDB, LNP, CNAM, and DA/DL services.

6. Order Status Repository (OSR) (52)

OSR 52 maintains the status of various legs of the transactions that are broken down by the WBE 32. Manual intervention will be required to fix the errors that arise out of automated provisioning.

7. Configuration Server (36)

The Configuration Server 36 provides the following functions:

Support Subscribe-Notify SIP based event mechanism.
Support XCAP to manage configuration data, e.g., user, service and device profiles.
Will provide all user, service and device profile data from the data store 40 as source of truth.
For performance reasons, configuration server 36 may cache user, service and device profiles. The caching option will be configurable.
Push configuration updates (i.e. user, service and device profile parameter changes) from Billing system 10, Portal to the SIP-based clients (hard clients 18, soft clients 60) in real-time.
Upload user profile changes from the SIP-based clients (hard clients 18, soft clients 60) to data store 40 via SSML services 50 in real-time.

8. SIP Infrastructure (20)

The SIP Infrastructure 20 provides the following functionality:

User authentication and authorization (to gain access to SIP-based network services).
End-point registration (maintains mapping a particular SIP address and/or E.164 # to the IP address of a user agent (UA)).
Message routing (including simple network-based features like call forwarding, etc.).
Enhanced feature support (e.g., multi-point conferencing with centralized media mixing).
Inter-domain routing of SIP session requests.
Providing network-based features associated with routing between multiple domains (e.g., least-cost routing).
ENUM integration for number management and routing.
Support for subscriptions and notifications.

9. Policy Server (PS) (22)

The Policy Server 22 enforces MSO-defined authorization and resource-management procedures. PS 22 applies rules against received Policy Requests. Requests that pass are proxied to the cable modem termination system (CMTS) 62 for admission control. PS 22 can push policy decisions to a CMTS 62 and respond to queries from the CMTS 62 for policy decisions.

10. Messaging Platform (MP) (34)

The messaging platform 34 provides the subscriber with voice mail, and video mail services. MP 34 will also provide notifications for messages and portal based access for message retrieval and preference settings.

11. Provisioning Group (PG) (38)

PG systems 38 are used to provision multiple technologies and devices including Cable Modems, digital set-top boxes and PacketCable eMTAs. The device will be added to a database (registration) and receive a proper configuration file (activation).

PG systems 38 also include a DHCP server to dynamically allocate IP addresses and a DNS server that is used to map between domain names and IP addresses.

12. Tools Database (TDB) (64)

TDB 64 is a central database of record for network element data. TDB 64 will be populated with subscriber and service data (e-mail, call features, etc.) written by PE 30. TDB 64 will also house billing data (rate codes, account number, customer ID, market ID, region ID, domain ID, etc.) TDB 64 has also near real-time feed from PG 38 for IP-address assignments to CM, and CPEs. TDB 64 maps a subscriber to a CMTS 62.

TDB 64 will be accessed by various OSS tools 65 and PS 22.

13. Subscriber Service Management Layer (SSMC) (50)

SSML 50 provides component services to do subscriber options, preferences and account management. Portal based service applications access these services to provide subscriber self-care account management services.

SSML 50 maintains data integrity and consistency in the DS 40 for updates from multiple sources (Portal, Configuration Server, etc.). SSML 50 provides a layer of abstraction around the data in the DS 40.

SSML 50 will be accessed by Configuration Server 36 to provide user/service/device profile information to the clients. SSML 50 will retrieve the data from the DS 40 to provide the information.

14. Data Store (DS) (40)

The DS 40 is used for product management, subscriber and device identity management, application/service configuration/authorization/activation and topology/infrastructure information. The DS 40 is the source of truth and the Configuration Server 36 and other downstream network elements need to be in sync with DS 40.

The DS 40 is used to hold the online service state of the subscriber. A subscriber's service is disconnected by request or by enabling business rules that determine the state of the subscriber over time (e.g., abandonment of the account or services for specified period of time will result in automated termination). The online state of the subscriber with respect to the provisioned devices and services will be written to the DS 40 by PE 30. Certain applications and aspects of these services such as Parental Controls and Presence-based service management will write/update the DS 40 independently of the PE 30.

On a much larger scale, the provisioning of subscriber, device, and service information through PE 30 into the DS 40 allows for the scale, flexibility, and redundancy to provide the subscriber a richer and cohesive environment. On an even grander scale, allowing third-party services to authenticate against the DS 40 allows subscribers to access to their services even off the service provider's footprint.

DS 40 supports the User—Service management paradigm as well as providing Service Access, Business Management, and Operational (Support System) Management.

15. STUN and TURN (80)

The STUN and TURN 80 are used by clients as follows:

The STUN (Simple Traversal of User Datagram Protocol (UDP) Through Network Address Translators (NATs)) is used by a client behind NAT to find out its public address, the type of NAT it is behind and the Internet side port associated by the NAT with a particular local port.

The TURN (Traversal Using Relay NAT) is used by clients behind a symmetric NAT or firewall to receive incoming data over TCP or UDP connections.

FIGS. 2-7 provide details of various flows [add/delete/modify service requests] for the automated boot-process for SIP-based clients in the preferred embodiment. In each figure, the follows are sequentially numbered to facilitate an understanding of the illustrated process. Further, labels for the flows are provided immediately below each flow diagram for clarity, and indicate the activity for the flows.

Figure 2:
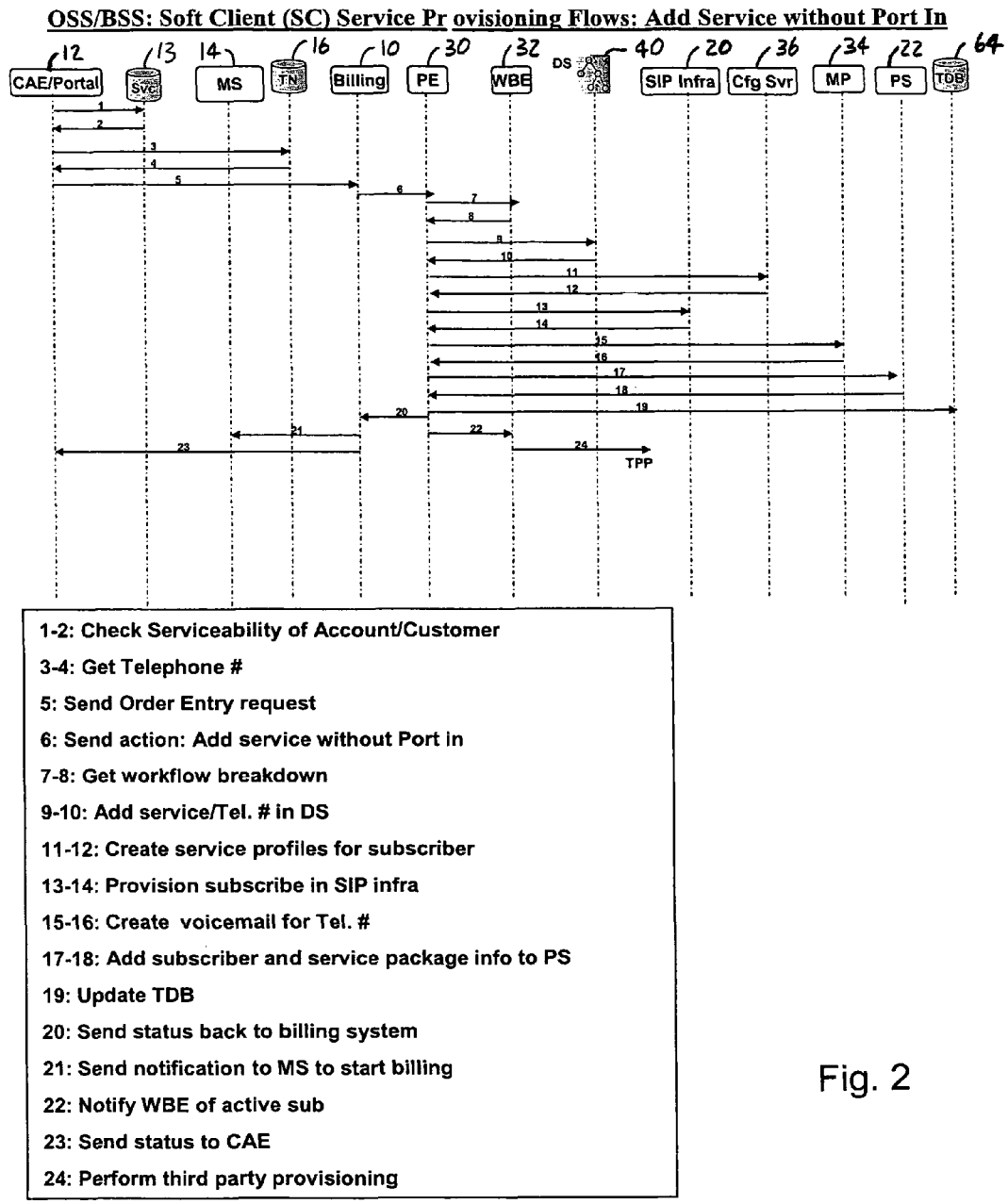
FIGS. 2-7 illustrate various provisioning flows in the preferred embodiment.

FIG. 2 provides details of the add service request for a soft client (SC) subscriber:

When the subscriber calls the Customer Account Executive (CAE) 12 to add service, serviceability check is performed, a telephone number is allocated, and an order is entered and after Third Party Validation (TPV) is done the order is sent down to the Provisioning Engine (PE) 30. (Flow 1-6.) A serviceability database for checking the serviceability of an account/customer is indicated at 13.

The PE 30 gets the breakdown of the order from the Work Breakdown Engine (WBE) 32. (Flows 7-8.)

Based on the WBE 32, various downstream systems—Messaging Platform (MP) 34, Policy Server (PS) 22, SIP Infrastructure 20, Tools Database (TDB) 64, Data Store (DS) 40, and Configuration Server (CS) 36—are updated with subscriber and service data. (Flows 9-19.)

PE 30 sends the overall order status of the transaction to the billing system 10. (Flow 20.)

Billing system 10 sends the subscriber data to Mediation Service (MS) 14 in real-time. This step is necessary to trigger MS 14 to start tracking the telephone call usage (type as local/long-distance/international, toll/non-toll, minutes etc.) for the subscriber. Subscriber data including primary account customer ID/Account ID, Telephone Number, Service Package information/Service Code/Rate Code, Monthly billing cycle, and Account scams are sent. (Flow 21.)

PE 30 will then update the provisioning tasks status in Order Status Repository (OSR) 52 and inform WBE 32 that the activation was successful. (Flow 22.)

Billing system 10 sends the status of the Order Entry to CAE 12. The CAE 12 provides download information [URL] to the customer. (Flow 23.)

WBE 32 will perform third party provisioning. Directory Assistance (DA)/Directory Listing (DL) will be updated with the customer listing information. Calling Name (CNAM) database will be updated with caller ID and calling name information. Automatic Location Identification (ALI) database will be updated with subscriber address information for E911. (Flow 24.)

Figure 3:
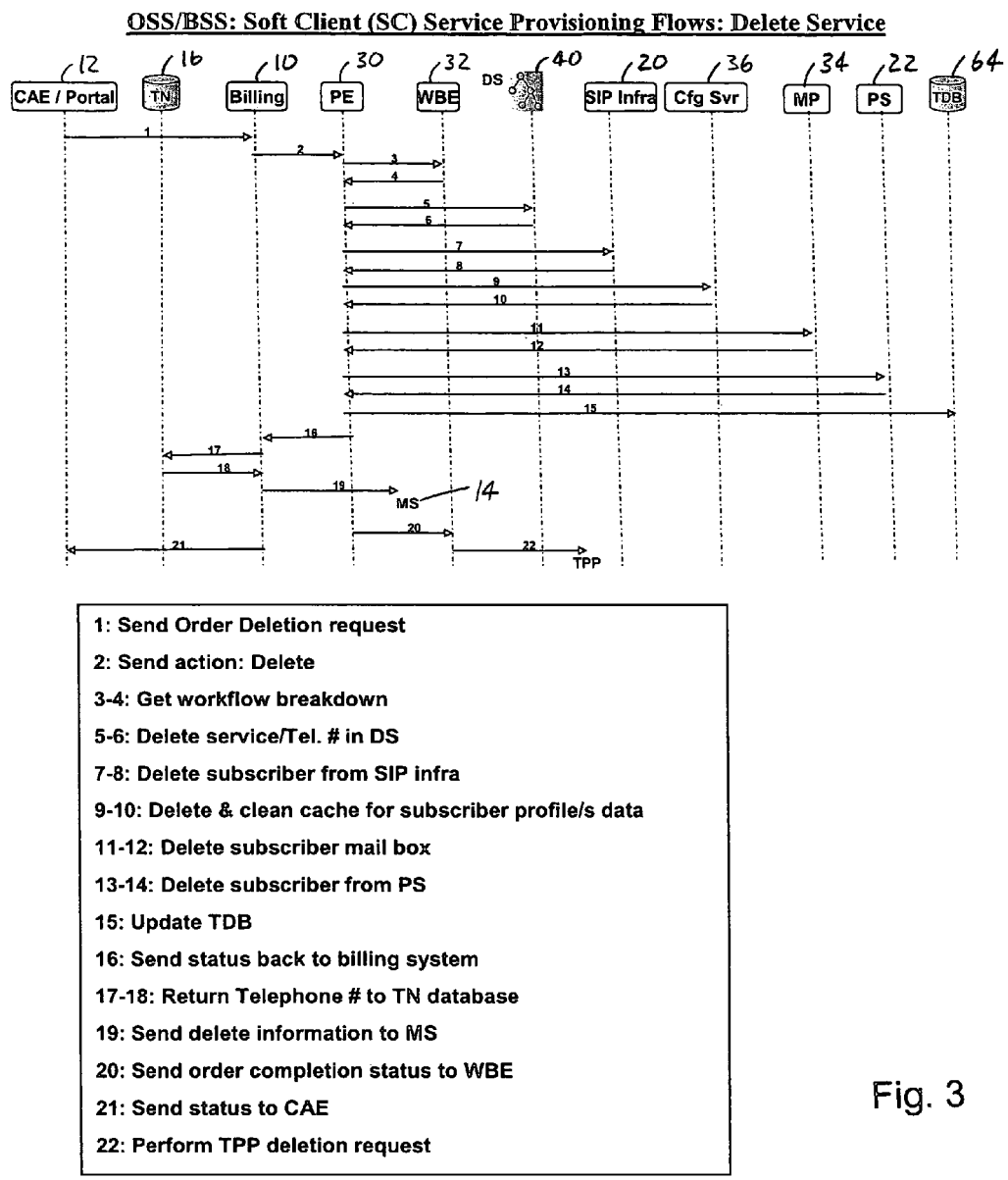

FIG. 3 provides details of the delete service request for a soft client (SC) subscriber:

When the subscriber calls the Customer Account Executive (CAE) 12 to delete service, an order is entered and sent down to the PE 30. (Flows 1-2.)

The PE 30 gets the breakdown of the order from the WBE 32. (Flows 3-4.)

Based on the WBE 32, various downstream systems—MP 34, PS 22, SIP Infrastructure 20, TDB 64, DS 40, and CS 36—are asked to delete subscriber and service data. (Flows 5-15.)

PE 30 sends the overall status of the transaction to the billing system 10. (Flow 16.)

The telephone number will be returned to the TN database 16. (Flow 17.)

The status of the operation to add the telephone number to the TN database 16 is returned to the Billing system 10. (Flow 18.)

Billing system 10 sends notification to MS 14 in real-time that the subscriber was deleted. (Flow 19.)

Upon reporting status of delete operation to billing system (Flow 16), PE 30 will then update the OSR data 52 with delete order status and inform WBE 32 that the deactivation is complete. (Flow 20.)

Upon completion of Flow 19, Billing system 10 sends the status of the delete service to CAE 12. (Flow 21.)

After receiving deactivation complete message from PE 30 (Flow 20), WBE 32 will perform third party provisioning to clear the account information. (Flow 22.)

Figure 4:
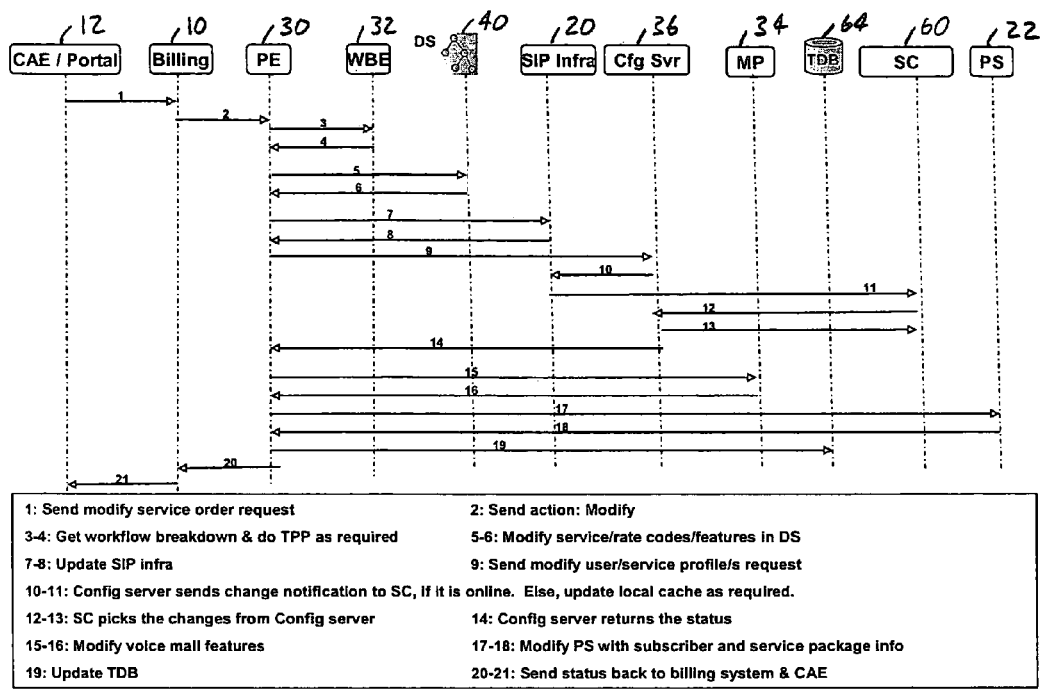

FIG. 4 provides details of the modify service request for a soft client (SC) subscriber:

When the subscriber calls the Customer Account Executive (CAE) 12 to modify service, an order is entered and sent down to the PE 30. (Flows 1-2.)

The PE 30 gets the breakdown of the order from the WBE 32. (Flows 3-4.)

Based on the WBE 32, various downstream systems—MP 34, PS 22, SIP Infrastructure 20, TDB 64, DS 40, and CS 36—are asked to modify subscriber and service data. (Flows 5-19.)

CS 36 notifies soft client (SC) 60 of change. (Flows 10-14.)

PE 30 sends the overall status of the transaction to the billing system 10. (Flow 20.)

Billing system 10 sends the status of the Order Entry to CAE 12. (Flow 21.)

Figure 5:
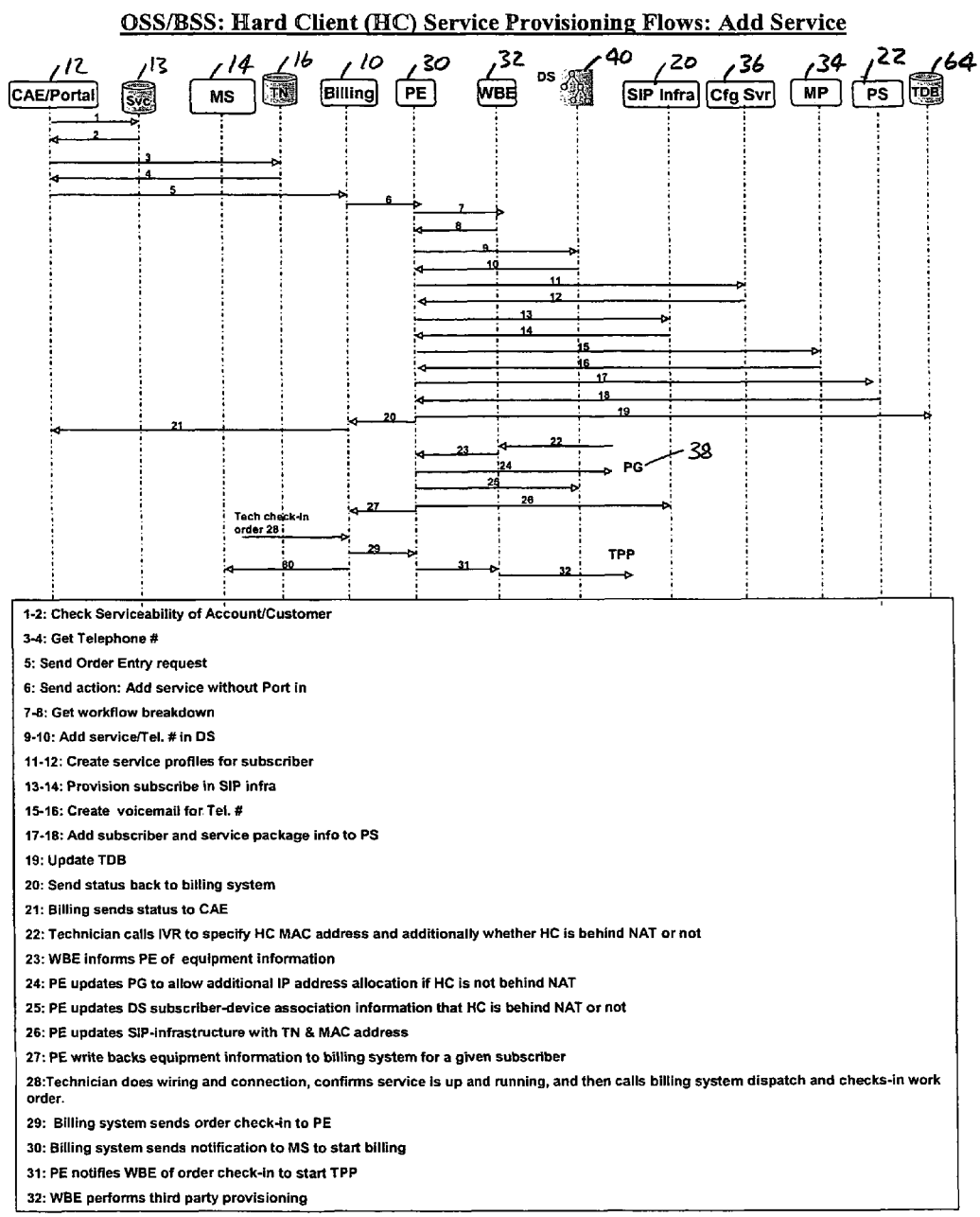

FIG. 5 provides details of the add service request for a hard client (HC) subscriber:

When the subscriber calls the Customer Account Executive (CAE) 12 to add service, serviceability check is performed, a telephone number is allocated, an order is entered and after Third Party Validation (TPV) is done the order is sent down to the Provisioning Engine (PE) 30. (Flows 1-6.)

The PE 30 gets the breakdown of the order from the Work Breakdown Engine (WBE) 32. (Flows 7-8.)

Based on the WBE 32, various downstream systems—Messaging Platform (MP) 34, Policy Server (PS) 22, SIP Infrastructure 20, Tools Database (TDB) 64, Data Store (DS) 40, and Configuration Server (CS) 36—are updated with subscriber and service data. (Flows 9-19.)

The order is not yet complete. The Billing System 10 is informed of the status of the provisioning request. (Flow 20.)

The Billing System 10 updates CAE with order entry status. (Flow 21.)

Technician calls IVR (from the subscriber site on the day of install) and enters MAC address. Technician also specifies whether HC 18 is behind NAT 70 or not. (Flow 22.)

WBE 32 sends update to PE 30 via Order Status Repository (OSR) 52 that the equipment information MAC address was checked in for specific subscriber and order (indirectly identifying TN). (Flow 23.)

PE 30 updates PG 38 to register HC 18 MAC address and allow additional IP address allocation if HC 18 is not behind NAT 70. (Flow 24.)

30 PE 30 updates DS 40 subscriber-device association information. (Flow 25.)

PE 30 updates SIP-infrastructure 20 with TN & MAC address for authentication purpose. (Flow 26.)

PE 30 writes back equipment information to billing system 10 for the given subscriber. (Flow 27.)

Technician does wiring and connection, confirms service is up and running, and then calls billing system dispatch and checks-in work order. If any of the previous steps failed, OSR 52 will have the status. The technician will have to call service delivery or fulfillment agent to resolve the issue. The service delivery or fulfillment agent will look at OSR 52 and will rectify the problem. (Flow 28.)

Billing system 10 sends order check-in to PE 30 and updates Mediation Server 14 with subscriber data. (Flows 29-30.)

PE 30 will then update the OSR data with order status and inform WBE 32 that the activation was successful. (Flow 31.)

WBE 32 will perform third party provisioning. Line Information Database (LIDB) will be updated. Directory Assistance (DA)/Directory Listing (DL) will be updated with the customer listing information. Calling Name (CNAM) database will be updated with caller ID and calling name information. Automatic Location Identification (ALI) database will be updated with subscriber address information for E911. (Flow 32.)

Figure 6:
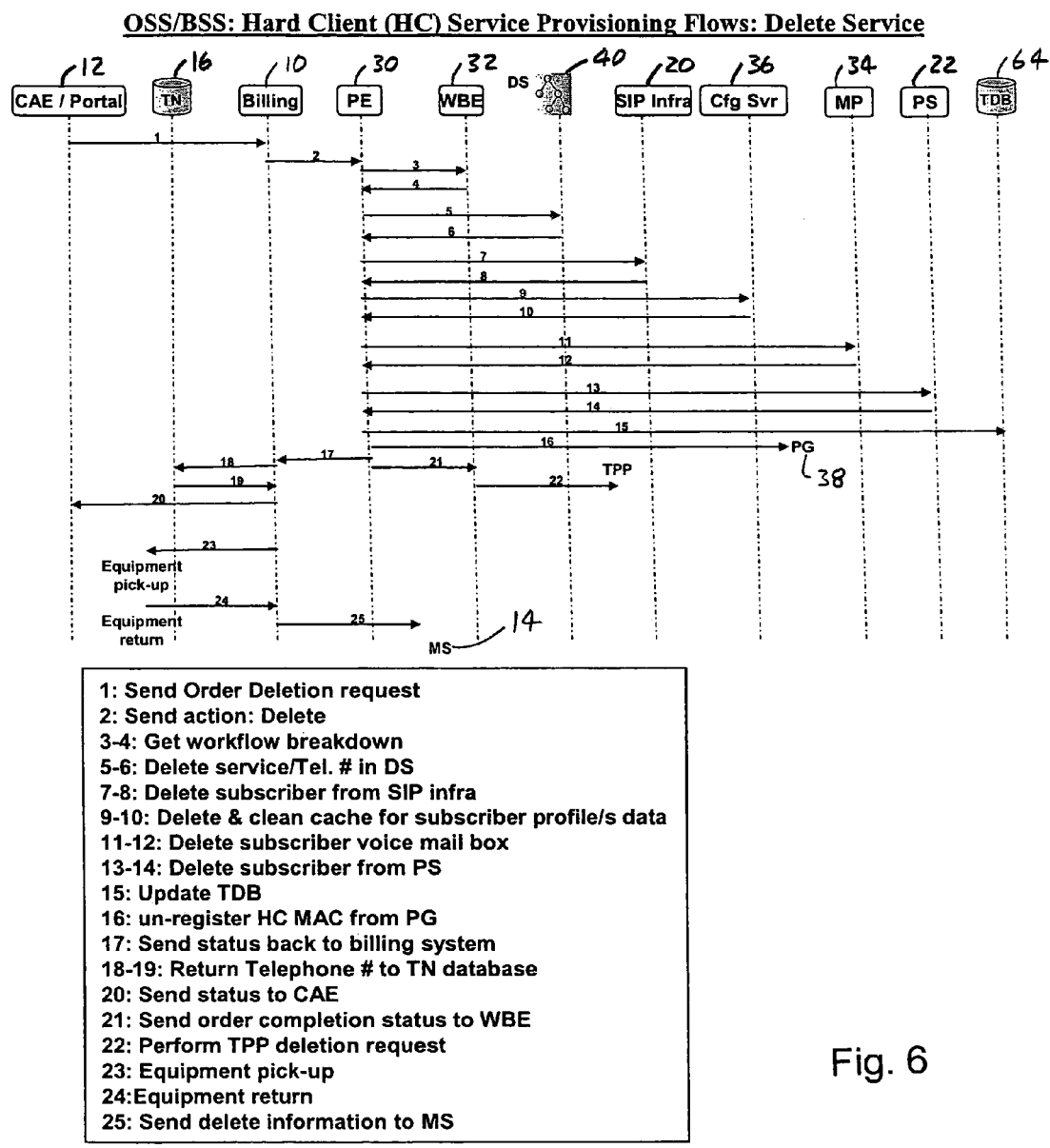

FIG. 6 provides details of the delete service request for a hard client (HC) 18 subscriber:

When the subscriber calls the Customer Account Executive (CAE) 12 to delete service, an order is entered and sent down to the PE 30. (Flows 1-2.)

The PE 30 gets the breakdown of the order from the WBE 32. (Flows 3-4.)

Based on the WBE 32, various downstream systems—MP 34, PS 22, SIP Infrastructure 20, TDB 64, DS 40, and CS 36—are asked to delete subscriber and service data. (Flows 5-15.)

If HC 18 is not behind NAT 70, PE 30 updates PG 38 to un-register HC MAC and reduce the number of IP addresses that can be allocated to CPEs, by 1. PE 30 will refer to DS 40 to figure out whether HC 18 is behind NAT 70 or not as this information is gathered thru IVR during equipment activation. If HC 18 was behind NAT 70, no change is required to the PG 38 for IP address allocation. (Flow 16.)

PE 30 sends the status of the transaction to the billing system 10. (Flow 17.)

The telephone number will be returned to the TN database 16. (Flows 18)

The status of the operation to add the telephone number to the TN database 16 is returned to the Billing System 10. (Flow 19.)

The Billing system 10 returns the status of the delete service to the CAE to 12. (Flow 20.)

PE 30 will then update the OSR data 52 to inform WBE 32 that the deactivation is complete. (Flow 21.)

WBE 32 will perform third party provisioning to disable account. LIDB will be updated. DA/DL will be updated with the customer listing information. CNAM database will be updated with caller ID and calling name information. Automatic Location Identification (ALI) database will be updated with subscriber address information for E911. (Flow 22.) p1 Billing system 10 will trigger an equipment pick-up event to the dispatch. (Flow 23.)

Equipment will be returned by the customer at a drop-off location or picked up on a truck-roll. (Flow 24.)

Billing system 10 sends notification to MS 14 in real-time that the subscriber was deleted. Only after the equipment has been picked up, MS 14 will be notified to generate the final bill since the equipment could be rented/leased. (Flow 25.)

Figure 7:
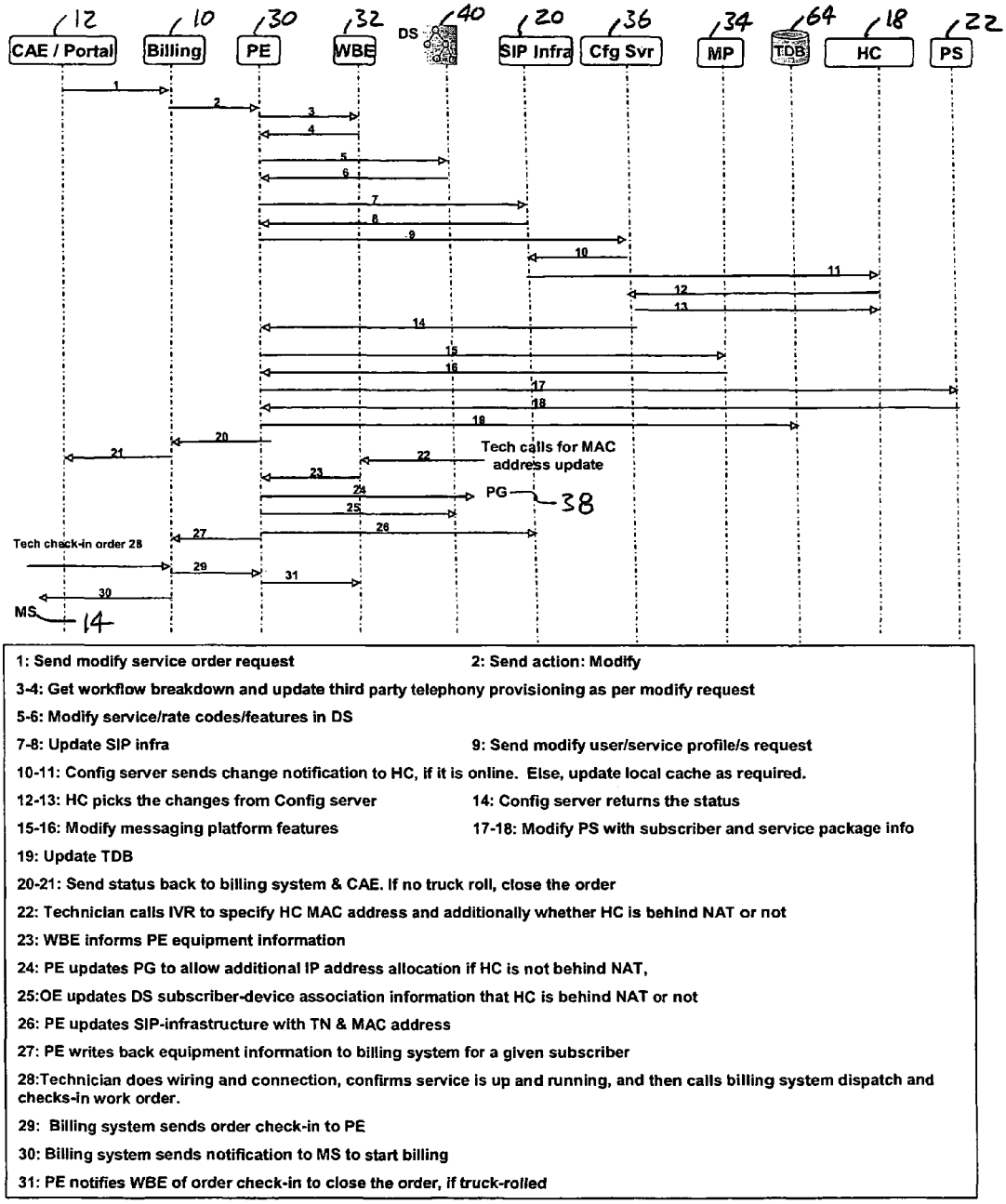

FIG. 7 provides details of the modify service request for a hard client (HC) 18 subscriber:

When the subscriber calls the Customer Account Executive (CAE) 12 to modify service, an order is entered and sent down to the PE 30. (Flows 1-2.)

The PE 30 gets the breakdown of the order from the WBE 32. (Flows 3-4.)

Based on the WBE 32, various downstream systems—MP 34, PS 22, SIP Infrastructure 20, TDB 64, DS 40, and CS 36—are asked to modify subscriber and service data. (Flows 5-19.)

CS 36 notifies HC 18 of change. (Flows 10-14.)

PE 30 sends the status of the transaction to the billing system 10. (Flow 20.)

Billing system 10 sends the status of the modify order to CAE 12. (Flow 21.)

If there is no truck-roll, the order is checked in. If there is truck-roll, the technician will perform the modifications and check in. (Flows 22-28.)

PE 30 is informed that the order is complete. (Flow 29.)

Billing system sends notification to MS 14 to start billing. (Flow 30.)

If truck-rolled, PE 30 notifies WBE 32 of order check-in to close order. WBE will perform third party provisioning to update the account, if required. (Flow 31.)

Figure 8:
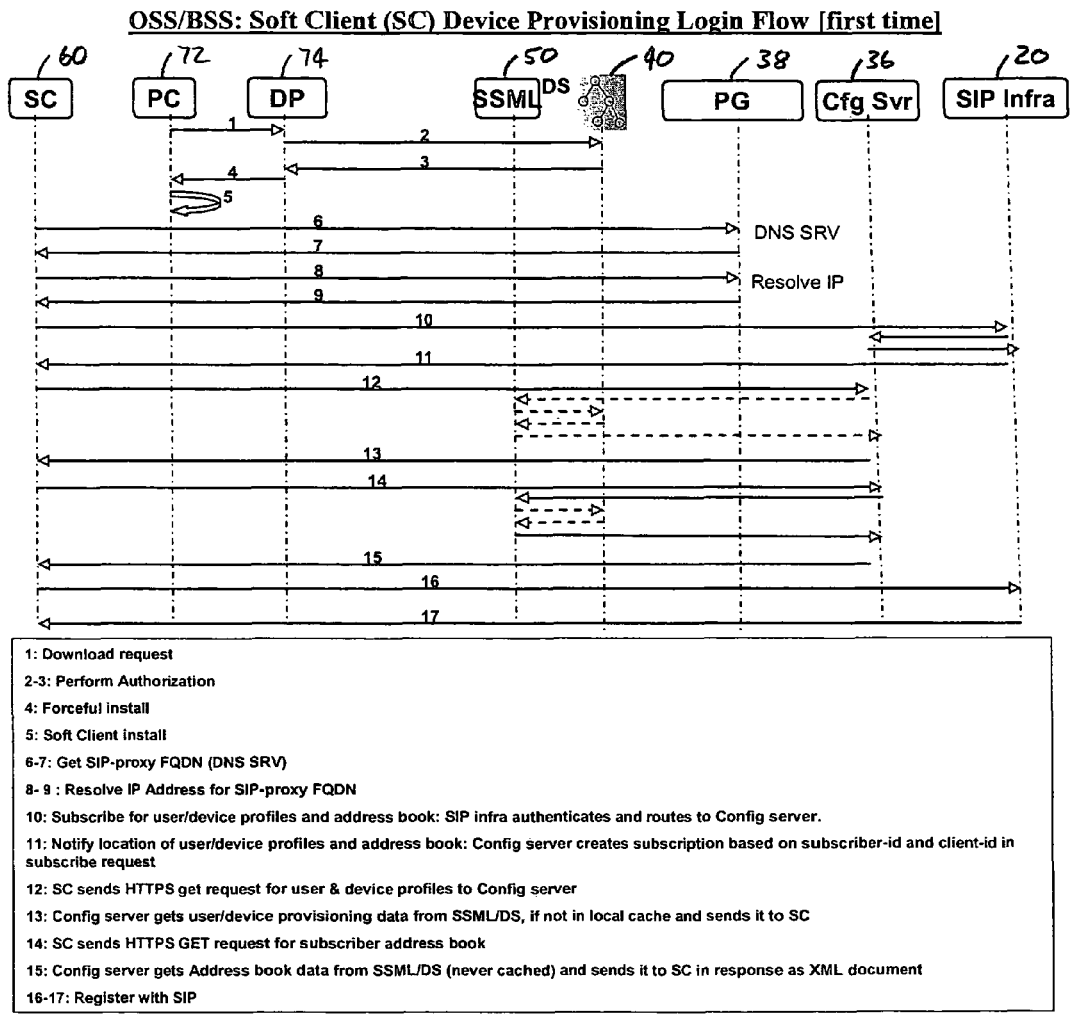
FIG. 8 illustrates the provisioning login flow for a soft client device logging in for the first time in the preferred embodiment.

FIG. 8 provides detailed flows for the automatic boot process for SIP-based Soft Clients (SC) 60 logging in for the first time in the preferred embodiment. The details of the automatic boot process for SIP-based SCs 60 are given below:

The PC 72 interacts with the DHCP server, (may be part of the Provisioning Group (PG) 38 or local NAT device) to get an IP address, default gateway address and DNS server information.

The subscriber goes to the download portal (DP) 74 to download the SC 60. (Flow 1.)

The DP 74 issues a LDAP query to the DS 40 to retrieve password information. (Flow 2.)

DP 74 validates the password and allows the download of the SC 60 to the PC 72. (Flow 3.)

Once the download is complete, the installation of the SC 60 will take place automatically. The domain name, backup fully qualified domain name (FQDN) of STUN server and SIP server are pushed down as part of the installation. (Flows 4-5.)

The SC 60 will send a DNS SRV query to get the service records for discovering the local SIP service. The DNS SRV resolution process involves a request/response transaction in which the client provides the specially formed FQDN derived from service name, domain name and client's preferred transport (e.g., sip._tcp.example-domain.com). The DNS infrastructure responds with a SRV record corresponding with the service addressing attributes. Should the DNS SRV fail, the backup FQDN will be used to avoid service disruption. (Flow 6.)

The DNS server will return list of SRV records having FQDN of available SIP Proxies (part of the SIP Infrastructure) along with the port number of the target host where the service may be found. (Flow 7.)

SC 60 will select a SRV record for SIP service based on priority and weight (this provides combination of load balancing and backup service). Then the client sends a query to the DNS to resolve the FQDN of the SIP Proxy from the selected SRV record. (Flow 8.)

The DNS server will return the IP address for the SIP Proxy. (Flow 9.)

The SC 60 will send a DNS SRV query to get service records for discovering the local STUN service.

After getting the list of SRV records for STUN service, the SC 60 will select a SRV record based on priority and weight. Then, the SC 60 will send a query to the DNS server to resolve STUN server FQDN from selected SRV record to get the IP address of the STUN server 80. Should the DNS SRV fail, the backup FQDN will be used to avoid service disruption.

SC 60 will interact with the STUN server 80 to determine whether it is behind a NAT device or not. In the process, SC 60 will also identify its public address, the type of NAT it is behind and the Internet side port associated by the NAT with a particular local port. The SC will be using this information to make SIP proxies aware about it. This will allow SIP proxies to interact with NATed SC 60

SC 60 will send a Subscribe message with NAT traversal information, i.e., public IP address and Internet side port in top most Via header as "received" and "rport" parameters to the SIP proxy to retrieve the user, service and device profiles. The SIP Infrastructure 20 challenges the Subscribe request if it does not have enough authentication information. The SC 60 will resend Subscribe request with authentication information (username and password) to SIP infrastructure. Upon successful authentication, SIP infrastructure routes the Subscribe message to the Configuration server 36. (Flow 10.)

The Configuration Server 36 creates subscription based on the subscriber ID and client ID in the "Subscribe" message and notifies the SC 60 of the location of the user, service and device profiles. Address book location will also be notified as part of service profile. CS 36 uses the SIP proxy to route the information back to the SC 60 using Notify message. (Flow 11.)

SC 60 sends XCAP request to the Configuration Server 36 requesting the user, service and device profiles. This time, the SIP Proxy is by-passed and the SC connects directly to the Configuration server 36. (Flow 12.)

Configuration Server 36 gets the user, service and device profile data from the DS 40 if it does not exist in its local cache and sends the data to the SC 60. (Flow 13.)

The address book related transaction is optional as same service could be accessed using other mechanisms, e.g., XMPP protocol. The SC has the option to leverage XCAP capabilities for accessing and managing address book. This is shown here as separate queries as it is optional and also to enable the shared address book data to reside on a location other than the Configuration server 36. The SC 60 will send XCAP request to CS 36 requesting for address-book. (Flow 14.)

Configuration Server 36 gets the address book data from the DS 40 and sends it to the SC 60. The address book data should not be cached in the Configuration Server 36. (Flow 15.)

The SC 60 will register with the SIP Proxy which is a front element of SIP infrastructure 20. The SIP Proxy will validate the credentials of the SC 60 if the domain of the SC 60 is correct. Otherwise, it will redirect the SC 60 to the correct domain. (Flow 16.)

The SIP Proxy on successful registration will send an OK, indicating that the registration was successful. (Flow 17.)

The SC 60 is now ready for communication and the subscriber can initiate or receive request for conversations to/from other subscribers.

Figure 9:
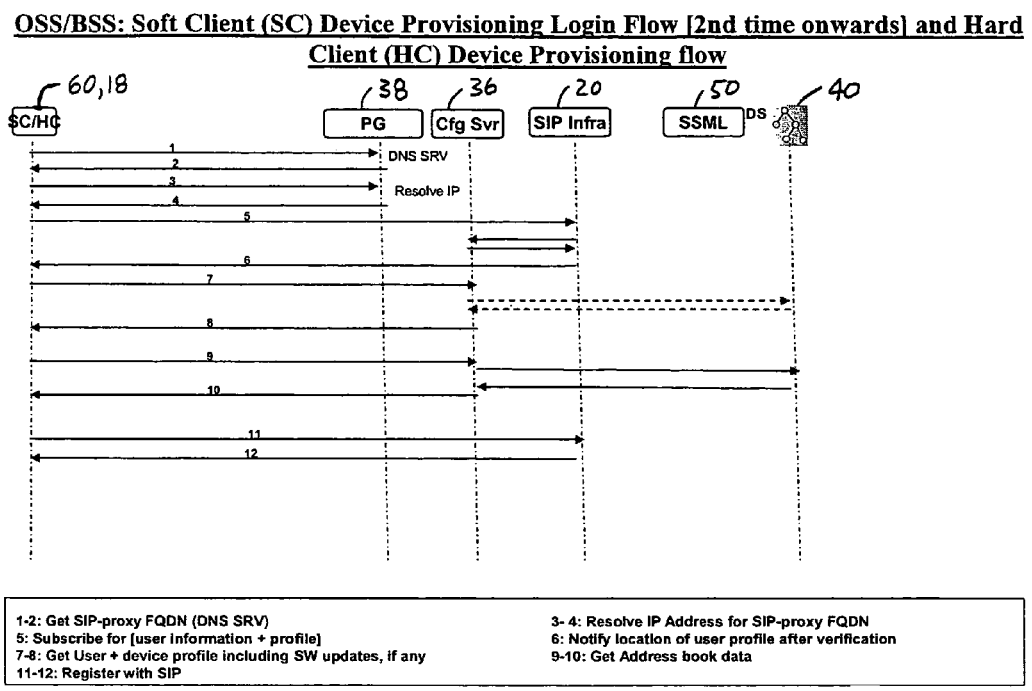
FIG. 9 illustrates the provisioning login flow for a soft client device on subsequent logins, and the hard client device login flow.

FIG. 9 provides detailed flows for the automatic boot process for SIP-based SCs 60 logging in for the 2nd time onwards and for hard clients (HC) 18 in the preferred embodiment. The details of the automatic boot process for SIP-based SC/HCs 60, 18 are given below:

If the HC 18 is behind a NAT 70, it will get an IP address from the NAT device. Otherwise, it will go to the DHCP Server (part of the PG 38) to get an IP address.

SC/HC 60, 18 on a login will send DNS SVR request to DNS server (part of the PG 38). (Flow 1.)

DNS provides list of SRV records to the SC/HC 60, 18 which will select a SRV record to get the SIP-proxy FQDN and Port information for SIP service. If DNS SRV fails backup FQDN should be used. (Flow 2.)

The SC/HC 60, 18 will interact with the DNS to resolve the IP address of the selected SIP Proxy FQDN. (Flows 3-4.)

The SC/HC 60, 18 will send a DNS SRV query to get service records for discovering the STUN service.

After getting the list of SRV records for STUN service, the SC/HC 60, 18 will select a SRV record based on priority and weight. Then, the SC/HC 60, 18 will send a query to the DNS server to resolve STUN server FQDN from selected SRV record to get the IP address. If the DNS SRV fails, the backup STUN FQDN will be used to avoid service disruption.

SC/HC 60, 18 will interact with the STUN server 80 to determine whether it is behind a NAT device 70 or not. In the process, SC/HC 60, 18 will identify its public address, the type of NAT it is behind and the Internet side port associated by the NAT with a particular local port. The SC/HC 60, 18 will be using this information to make SIP proxies aware about it. This will allow SIP proxies to interact with NATed SC/HC 60, 18

SC/HC 60, 18 will send a Subscribe message to the SIP Proxy for user, service, device profiles. (Flow 5.)

SIP Proxy will authenticate the request and send the request to the Configuration server 36.

Configuration server 36 will send a Notify message to the SC/HC 60,18 through the SIP Proxy containing the location of the user, service and device profiles. The device profile will have software/firmware upgrade information (e.g., new version, filename/package-name, location, upgrade-type mandatory or optional, etc.) for SC/HC 60, 18. The configuration server is capable of sending Notifications in real-time or on schedule as long as SC/HC 60, 18 are subscribed with Configuration server and whenever new version software/firmware available and related information is added to DS 40, usually done by operations as manual procedures. (Flow 6.)

The SC/HC 60, 18 will directly send XCAP request to the Configuration server 36 to get the user, service, and device profile updates. If there is new version available in DS 40, then configuration server will return device profile that is suggesting SC/HC 60, 18 to do software/firmware upgrade. The SC/HC 60, 18 must upgrade if device profile specifies upgrade is mandatory. Otherwise, subscriber is at will. For upgrade, SC/HC 60, 18 will directly download software/firmware from the location specified in device profile. After the download, SC/HC 60, 18 must backup the old image. Then SC/HC must install and use new software/firmware automatically and re-get user, service, and device profiles from Config Server by sending XCAP request with latest make-model-version information. (Flow 7.)

The URL format for XCAP request should be formed as follows:

```
<XCAP-root> <Document-selector>[<Node-selector>]
Where
    XCAP root       =    https://<config_server_fqdn>/xcap
    Document        selector        =
    <application_id>/<user_id>/<device_id>/<doc_id>
        <application_id> = /vcom/2_0/configuration
        <user_id> = /users/username used for authentication
            for Softclient, it is Comcast.net username
            for Video Phone(VP), it is serial number/MAC of
VP
        <device_id> = /<vendor>/<model>/<version>
            for Softclient, Eyeball/SC/2_0
            for Video phone, Innimedia/VP/2_0
        <doc_id> = /all.xml
    Node selector = will be based on XML schema of full configuration
    containing user, service and device profile data.
```

Configuration server 36 will send the data for the user, service and device profile [deltas over previously sent data]. If the data is in the local cache, Configuration Server 36 will send it to the SC/HC 60, 18 directly. Otherwise, it will retrieve the data from SSML/DS 50, 40 and then send the data to the SC/HC 60, 18. (Flow 8.)

SC/HC 60, 18 may optionally sends XCAP requests to get address book data. Config Server 36 retrieves address book data from the DS 40 and sends back data as XCAP response to the SC/HC 60, 18. Note: The address book service could be hosted on Configuration Server 36 or as separate XCAP server. (Flows 9-10.)

SC/HC 60, 18 is then ready to register with the SIP Proxy. (Flow 11.)

SIP Proxy authenticates the data using information from the local data store and sends back a status of the registration. (Flow 12.)

Figure 10:
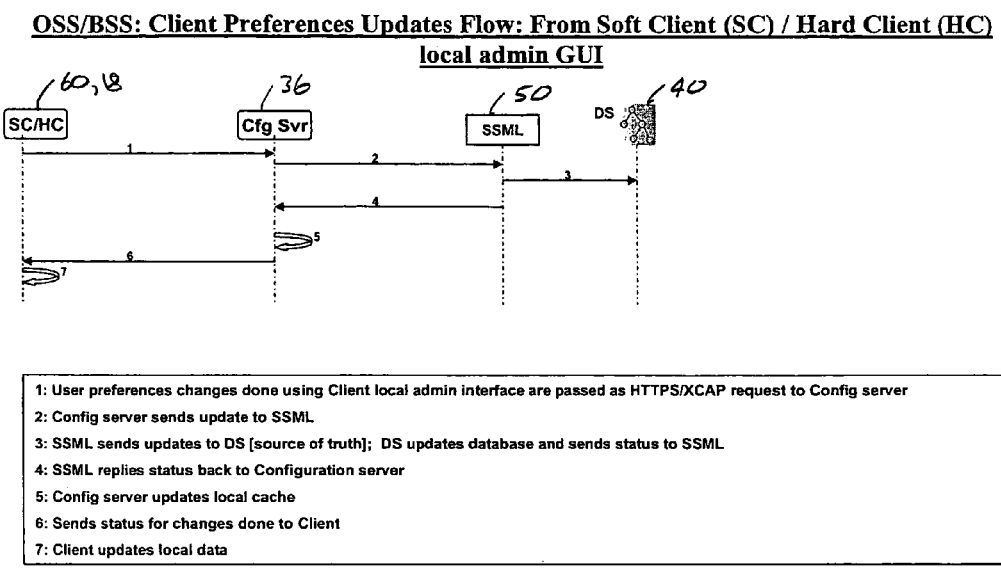
FIG. 10 illustrates the updating of client preferences from the soft client or hard client through a local administration graphical user interface (GUI)

FIG. 10 provides detailed information about updates from SC/HC 60, 18 to client preferences (part of user profile) and/or address book changes made from the SC/HC's 60, 18 local Graphical User Interface (GUI):

When the subscriber wants to make changes to the client preferences (part of user profile) and/or the address book, the local administration GUI will be brought up. The subscriber will modify the preferences and/or address book in the GUI. The changes done to the preferences and/or address book are sent to the Configuration Server 36. The entire transaction will be a synchronous transaction and will be complete when the Configuration Server 36 returns the status of the update to the SC/HC 60, 18. (Flow 1.)

The Configuration Server 36 writes to the SSML 50. The Configuration Server 36 will wait synchronously with the data for the status from SSML 50. (Flow 2.)

SSML 50 writes to DS 40. The status of the LDAP write will be available to SSML 50. (Flow 3.)

SSML 50 will send the status of the updates to the Configuration Server 36. (Flow 4.)

Configuration Server 36 will update its cache with the newly modified client preferences data. The address book changes, if any, will not be cached or modified by the Configuration Server 36. (Flow 5.)

Configuration server 36 will then send the status of the updates back to the SC/HC 60, 18. (Flow 6.)

On successful update, SC/HC 60, 18 will update the local data structures with the modified user, service and device profiles, and address book data. The SC/HC 60, 18 will reflect the changes on GUI as required. (Flow 7.)

Figure 11:
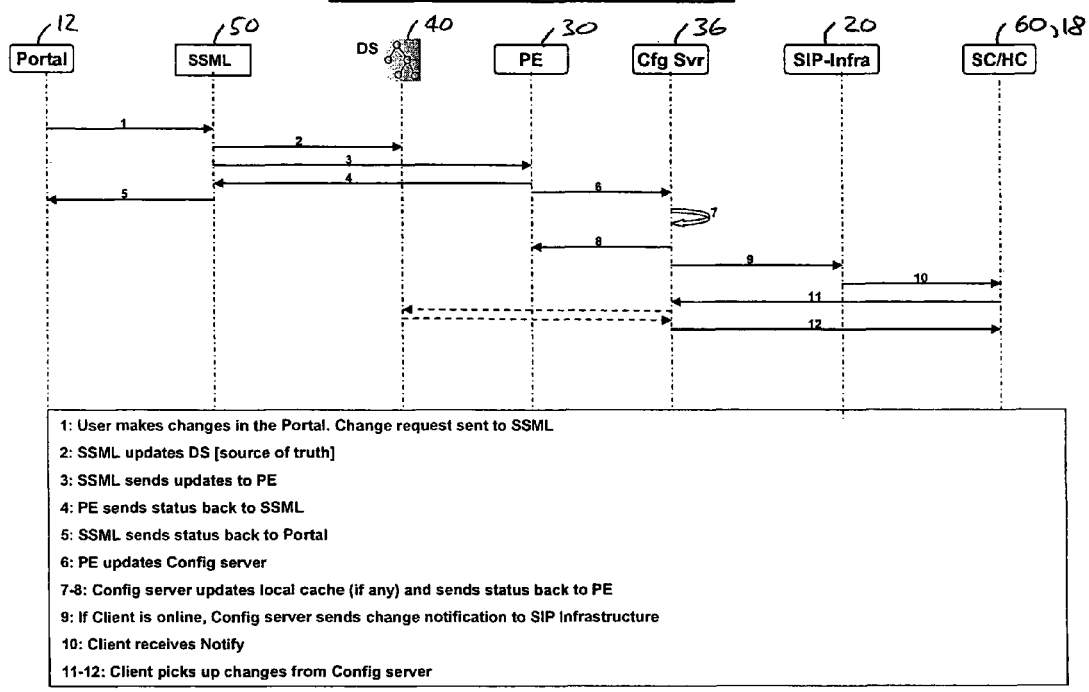
FIG. 11 illustrates the updating of client preferences using a portal)).

FIG. 11 provides detailed information about updates made from the Portal to client preferences (part of user profile) and/or the address book in the preferred embodiment:

Subscriber makes changes in the Portal 12 and the Portal 12 forwards the changes to SSML 50. (Flow 1.)

SSML 50 writes the changes to the DS 40. The status of the DS 40 write is available to SSML 50. (Flow 2.)

SSML 50 sends the updates to the PE 30. (Flow 3.)

PE 30 acknowledges update request to SSML 50. Downstream updates are done asynchronously with guaranteed delivery. (Flow 4.)

SSML 50 sends the status of the update to the Portal 12. As soon as the DS 40 is updated and the request has been acknowledged by PE 30, the status is sent back to the Portal 12 to ensure that system resources are not tied up for this transaction. (Flow 5.)

The PE 30 then updates the Configuration Server 36. (Flow 6.)

Configuration Server 36 modifies its local cache, if any. (Flow 7.)

The Configuration Server 36 sends the status back to the PE 30. (Flow 8.)

Configuration Server 36 sends a Notify (SIP Protocol) message to SIP Proxy (contains the Location of modified user/device profile information), and/or addressbook change notification, if SC/HC 60, 18 is online. If SC/HC 60, 18 is not online, the changes will be applicable on next login. (Flow 9.)

SIP Proxy will forward the Notify message (contains the Location of modified user/device profile information) to SC/HC 60, 18 if it is online. (Flow 10.)

SC/HC 60, 18 will send XCAP request to get the modified information (user, service and/or device profile) from the Configuration Server 36. (Flow 11.)

Configuration Server 36 will send down the modified (user and/or device profile) information from its cache to SC/HC 60, 18, if the data is present in its cache. Otherwise, the Configuration Server will get the data from the DS 40 and send it to SC/HC 60, 18. (Flow 12.)

SC/HC 60, 18 will request address book changes from the Configuration Server 36, which then retrieves it from the DS 40 and sends the data back to the SC/HC 60, 18. (Flows 11-12.)

Preferred embodiments of the invention has many advantages. For example, it is possible to automate the provisioning process to provide for an integrated solution that provides for NAT traversal, real-time updates to SC/HC, maintain persistence of data in a centralized place to enable the subscriber to have a consistent experience across a variety of platforms and hardware solutions, support for nomadic clients, support charging functions (prepaid services/account activation/de-activation), be network agnostic for efficient transfer of changed data elements, provide call detail record information on-demand, provision 3rd party systems, and provision new network elements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   receiving an authenticated message at a configuration server from a proxy server, the authenticated message identifying a client;
   sending a notification to the proxy server from the configuration server, the notification including locations for a plurality of profiles including a location of a user profile, and a location of a service profile;
   receiving, at the configuration server, a request for profiles from the client, the request including the location of the user profile and the location of the service profile, wherein the request bypasses the proxy server; and
   the configuration server, in response to receiving the request for profiles, performing:
      determining whether a device profile specifying an update for the client is available,
      upon determining that a device profile specifying an update for the client is available, sending the device profile specifying the update to the client, and
      sending the user profile and the service profile to the client from the locations of the user profile and the service profile.

2. The method of claim 1 wherein the device profile includes a location of a client update for the client, the client update being at least one of a software update and a firmware update, wherein sending the device profile specifying the update to the client includes sending the location of the client update, the method further comprising:
   sending the client update to the client from the location of the client update, the sending of the client update bypassing the configuration server and the proxy server.

3. The method of claim 1 further comprising:
   adding information to one of the plurality of profiles, resulting in a changed profile;
   in response to the adding, sending a second notification to the client from the configuration server, the second notification being sent through the proxy server, and the second notification including an update location of the changed profile; and
   sending at least a portion of the changed profile to the client from the update location.

4. The method of claim 1 further comprising:
   deleting information from one of the plurality of profiles, resulting in a changed profile;
   in response to the deleting, sending a second notification to the client from the configuration server, the second notification being sent through the proxy server, and the second notification including an update location of the changed profile; and
   sending the changed profile to the client from the update location.

5. The method of claim 1 further comprising:
   subsequent to sending the user profile and the service profile to the client, modifying one of the plurality of profiles, resulting in a changed profile;
   in response to the modifying, sending a second notification to the client from the configuration server, the second notification being sent through the proxy server, and the second notification including an update location of the changed profile; and
   sending the changed profile to the client from the update location.

6. The method of claim 1 wherein the service profile includes an address book location.

7. The method of claim 1 further comprising:
   receiving an updated profile at the configuration server from the client.

8. The method of claim 1 further comprising:
   sending a second notification to the client from the configuration server, the second notification being sent through the proxy server, and the second notification including an update location of an updated profile for the client; and
   sending the updated profile to the client from the update location.

9. A system comprising:
   a configuration server connected to a network;
   a proxy server connected to the network;
   the proxy server being configured to:
      route messages from a client to a configuration server, wherein the routing includes: receiving a message from a client, authenticating the message, and sending the authenticated message to the configuration server; and
   the configuration server being configured to:
      send a notify message to the client, the notify message being sent through the proxy server, and the notify message including locations for a plurality of profiles including a location of a user profile and a location of a service profile, and
      receive a request for profiles from the client, the request including the location of the user profile and the location of the service profile, wherein the request bypasses the proxy server; and
      in response to receiving the request for profiles, perform:
         determining that a device profile specifying an update for the client is available,
         sending the device profile specifying the update to the client, and sending the user profile and the service profile to the client from the locations of the user profile and service profile.

10. The system of claim 9 further comprising:
an address server configured to:
communicate with the client, wherein the communication results in NAT traversal information that enables NAT traversal when sending the message, authenticating the message, sending the notify message, and sending profile data;
wherein the message includes the NAT traversal information.

11. The system of claim 9, wherein the proxy server is further configured to:
register the client with the proxy server to allow interactive user sessions that involve multimedia.

12. The system of claim 9, wherein the client resolves the proxy server prior to sending the message.

13. The system of claim 9 wherein the client is a hardware client.

14. The system of claim 9 wherein the client is a software client executing on customer premise equipment.

15. The system of claim 9 wherein the configuration server is configured to, in response to a change being made to a profile, send a second notify message to the client, the second notify message being sent through the proxy server, and the second notify message containing a location of an updated profile for the client to allow the client to download the updated profile.

16. The system of claim 9 wherein the client operates using Session Initiation Protocol (SIP).

17. The system of claim 9 wherein the service profile includes an address book location.

18. A method comprising:
receiving an authenticated message at a configuration server from a proxy server, the authenticated message identifying a client device;
sending a notification to the proxy server from the configuration server, the notification including locations for a plurality of profiles including a location of a user profile, a location of a service profile, and a location of a device profile;
receiving, at the configuration server, a request for profiles, the request including the location of the user profile, the location of the service profile and the location of the device profile; and
the configuration server, in response to receiving the request for profiles, performing:
determining whether an updated device profile specifying an update for the client is available, wherein the determining includes accessing the location of the device profile,
upon determining that an updated device profile specifying an update for the client is available, sending the updated device profile to the client from the location of the device profile, and
sending the user profile and the service profile to the client from the locations of the user profile and the service profile.

19. The method of claim 18, wherein the user profile includes client preference information and the service profile includes address book information.

20. The method of claim 18, wherein the service profile includes a location of an address book and the method further comprises:
receiving, at the configuration server, an address book request, the request including the location of the address book;
retrieving the address book from the location; and
sending the address book to the client device.

* * * * *

UNITED STATES PATENT AND TRADEMARK OFFICE
CERTIFICATE OF CORRECTION

PATENT NO. : 8,019,986 B2
APPLICATION NO. : 11/503830
DATED : September 13, 2011
INVENTOR(S) : Chaudhari et al.

It is certified that error appears in the above-identified patent and that said Letters Patent is hereby corrected as shown below:

In the Specification, Column 2, Line 23:
Please replace "portal))." with --portal.--

In the Specification, Column 6, Line 11:
Please replace "scams" with --status--

In the Specification, Column 8, Line 22:
Please replace "CAE to 12" with --CAE 12--

In the Specification, Column 8, Line 31:
Please replace "p1" with a paragraph break.

Signed and Sealed this
Third Day of April, 2012

David J. Kappos
*Director of the United States Patent and Trademark Office*